(12) United States Patent
Omidfar

(10) Patent No.: US 9,598,001 B2
(45) Date of Patent: Mar. 21, 2017

(54) HAZARD BEACON

(76) Inventor: Ali Omidfar, Newbury Park, CA (US)

( * ) Notice: Subject to any disclaimer, the term of this patent is extended or adjusted under 35 U.S.C. 154(b) by 0 days.

(21) Appl. No.: 13/219,516

(22) Filed: Aug. 26, 2011

(65) Prior Publication Data

US 2013/0051055 A1  Feb. 28, 2013

(51) Int. Cl.
| | |
|---|---|
| *F21V 5/00* | (2015.01) |
| *B60Q 1/26* | (2006.01) |
| *B60Q 1/44* | (2006.01) |
| *B60Q 1/52* | (2006.01) |
| *F21S 8/10* | (2006.01) |

(52) U.S. Cl.
CPC ......... *B60Q 1/2611* (2013.01); *B60Q 1/444* (2013.01); *B60Q 1/52* (2013.01); *F21S 48/1131* (2013.01); *F21S 48/215* (2013.01); *F21S 48/22* (2013.01)

(58) Field of Classification Search
CPC ........ B60Q 1/2611; B60Q 1/444; B60Q 1/52; F21S 48/1131; F21S 48/215; F21S 48/22
USPC ........................................ 362/521, 520, 800
See application file for complete search history.

(56) References Cited

U.S. PATENT DOCUMENTS

| | | | | |
|---|---|---|---|---|
| 3,784,974 | A * | 1/1974 | Hamashige | 340/464 |
| 6,824,299 | B2 * | 11/2004 | Mohri et al. | 362/487 |
| 7,416,312 | B1 * | 8/2008 | McDermott | 362/216 |
| 7,772,988 | B1 * | 8/2010 | Condon | G09F 13/14 340/431 |
| 2002/0034078 | A1 * | 3/2002 | Natsume | 362/509 |
| 2003/0234724 | A1 * | 12/2003 | Chiu | 340/464 |
| 2005/0265041 | A1 * | 12/2005 | Wimbert | 362/545 |
| 2006/0291232 | A1 * | 12/2006 | Reading | 362/521 |
| 2008/0198615 | A1 * | 8/2008 | Klipstein | 362/538 |
| 2011/0260616 | A1 * | 10/2011 | Chaterlea et al. | 315/82 |

* cited by examiner

*Primary Examiner* — Andrew Coughlin
*Assistant Examiner* — Jessica M Apenteng
(74) *Attorney, Agent, or Firm* — Buche & Associates, P.C.; John K. Buche; Bryce A. Johnson

(57) ABSTRACT

An apparatus including at least one Light Emitting Diodes (LEDs) mounted on a platform; a mechanism for controlling the at least one LEDs; and at least one refractive optic lenses for focusing at least one light beam from the at least one LEDs into at least one well-defined light beams and for directing the at least one well-defined light beams either in an upward direction or in a sideward direction to the platform. In one example, the platform is a vehicle.

12 Claims, 15 Drawing Sheets

BEACONS PULSE WITH FLASHERS

BEACONS AND FLASHERS PULSE INDEPENDENTLY

BEACONS AND FLASHERS OPERATED INDEPENDENTLY

HAZARD BEACON

FIELD

This disclosure relates generally to apparatus and methods for emergency lighting. More particularly, the disclosure relates to hazard beacons for vehicles.

BACKGROUND

Currently vehicles being produced for use in the United States are required to have hazard flashers which are intended to be used to alert oncoming traffic that there is a situation ahead which requires special caution. For example, the hazard flashers may pulse light beams as a warning of an emergency situation. In high-traffic situations, the flashers from the vehicle-in-distress can be obscured from view by intervening traffic. The vehicle immediately behind the hazard and other vehicles which have line-of-sight visibility to the flashers receive warning. But approaching traffic without line-of-sight visibility to the flashers does not receive warning. This is particularly a problem for traffic approaching from the rear and can lead to a variety of accidents including rear-end collisions with traffic which has slowed for the hazardous condition or collisions with vehicles which abruptly change lanes to avoid being behind the vehicle-in-distress. Thus, there is a need for a hazard warning system which is visible to cars approaching from the rear which do not have line-of-sight visibility to the vehicle posing the hazard.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed is an apparatus directed towards hazard beacons. According to one aspect, an apparatus including at least one Light Emitting Diodes (LEDs) mounted on a platform; a mechanism for controlling the at least one LEDs; and at least one refractive optic lenses for focusing at least one light beam from the at least one LEDs into at least one well-defined light beams and for directing the at least one well-defined light beams either in an upward direction or in a sideward direction to the platform. In one example each of the LEDs is between 0.1 to 3 Watts. In one example, more than one LEDs are interspersed among at least one other light bulb within a light assembly or more than one LEDs are clustered together within the light assembly.

In one example, the mechanism for controlling the LEDs controls at least one of the following characteristics of the LEDs: light intensity, color of light emitted or power consumption.

In one example, one of the refractive optic lenses is mounted over the LEDs. In one example, the refractive optic lens includes at least one leg for attaching to the platform and the platform may be part of a vehicle. In one example, the refractive optic lens includes a pattern for focusing the at least one light beam, for example, the pattern may allow for directing the at least one well-defined light beams either in an upward direction or in a sideward direction to the platform. In one example, the pattern allows for directing at least two well-defined light beams comprising a first well-defined light beam directed in an upward direction to the platform and a second well-defined light beam directed in a sideward direction to the platform.

In one example, the LEDs emit one of the following colors: red, green or blue. In one example, one or more of the LEDs is one of the following: a single color LED, a dual-color LED or a tri-color LED. In one example, the LEDs display a preselected color based on one of the following conditions: an accelerator of a vehicle is engaged, a brake of the vehicle is engaged or the vehicle is coasting, wherein the platform on which the LEDs are mounted is part of the vehicle.

Advantages of the present disclosure may include improve visibility of hazard beacons, especially to observers not directly behind. The features, nature, and advantages of the present disclosure will become more apparent from the detailed description set forth below when taken in conjunction with the drawings.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In one aspect, the present disclosure relates to a hazard beacon system by which approaching traffic which is unable to directly see a vehicle-in-distress can nonetheless receive adequate warning that a hazard exists ahead and thereby take appropriate measures to avoid harm.

Figure 1:
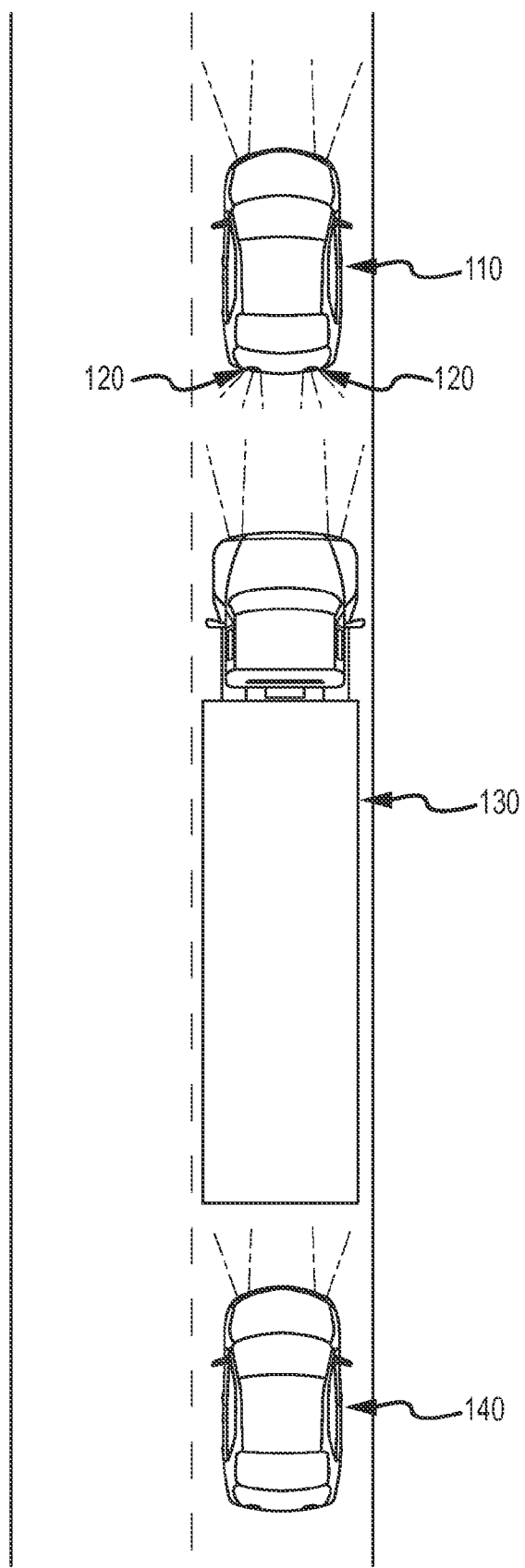
FIG. 1 illustrates an example of a dangerous commonly-occurring traffic situation as seen from a top view.

FIG. 1 illustrates an example of a dangerous commonly-occurring traffic situation as seen from a top view. In this one example, it is dark and a first vehicle, which is the vehicle-in-distress 110, poses a hazard because it is moving much more slowly than other traffic traveling down the roadway. The hazard flashers 120 of the vehicle-in-distress are being operated to give warning of the hazard. A second vehicle 130, which is an intervening vehicle has come up behind the vehicle-in-distress 110. The driver in the intervening vehicle can see the hazard flashers from the vehicle-in-distress and has slowed down in response to the hazard. Now a third vehicle 140, which is the vehicle-approaching-from-the-rear, comes up behind the second vehicle 130 (intervening vehicle). Because the second vehicle blocks the view of the hazard flashers 120, the driver of the third vehicle 140, which is approaching from the rear, cannot see them and has no warning of the hazardous situation.

Figure 2:
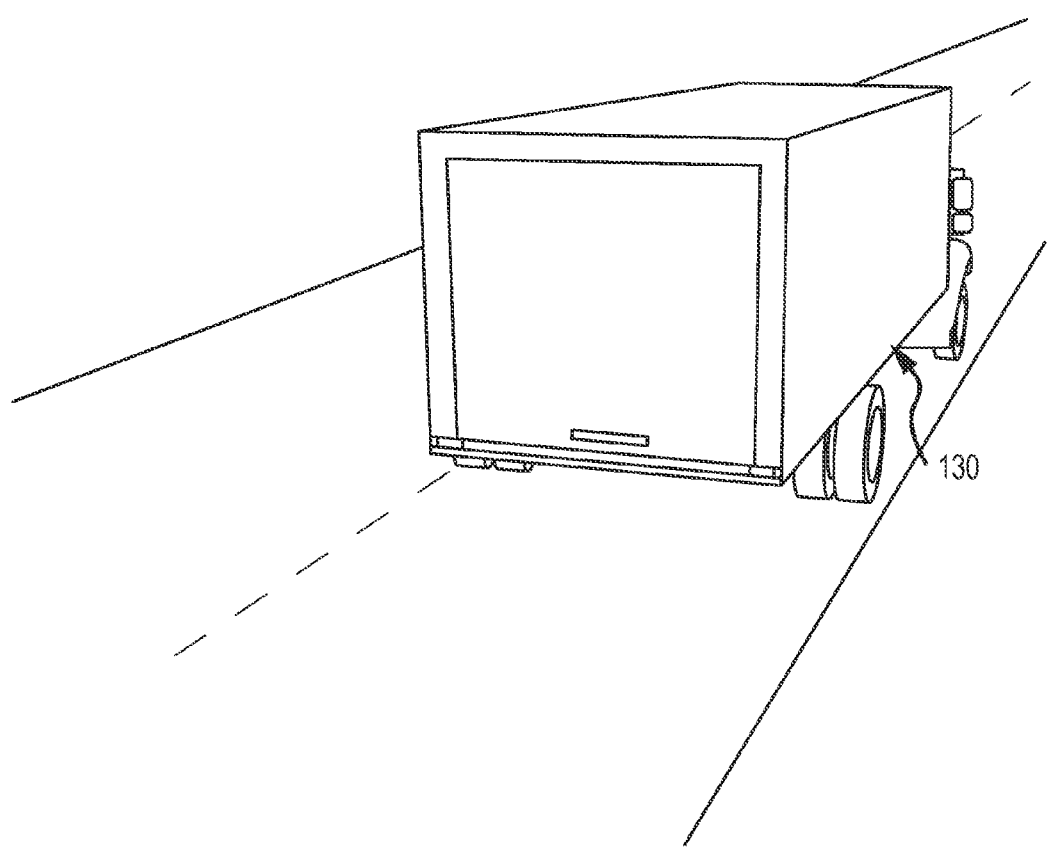
FIG. 2 illustrates the example from FIG. 1 as seen from the vehicle-approaching-from-the-rear.

FIG. 2 illustrates the example from FIG. 1 as seen from the vehicle-approaching-from-the-rear. The driver of the vehicle-approaching-from-the-rear cannot see the hazard flashers because the intervening vehicle blocks the view, and so the driver of the vehicle-approaching-from-the-rear may not react in time to avoid colliding with the intervening vehicle. This example represents a variety of hazardous situations which may arise because intervening vehicles can block the hazard flashers from the view of vehicles which are behind, but not immediately behind, the vehicle-in-distress.

Figure 3:
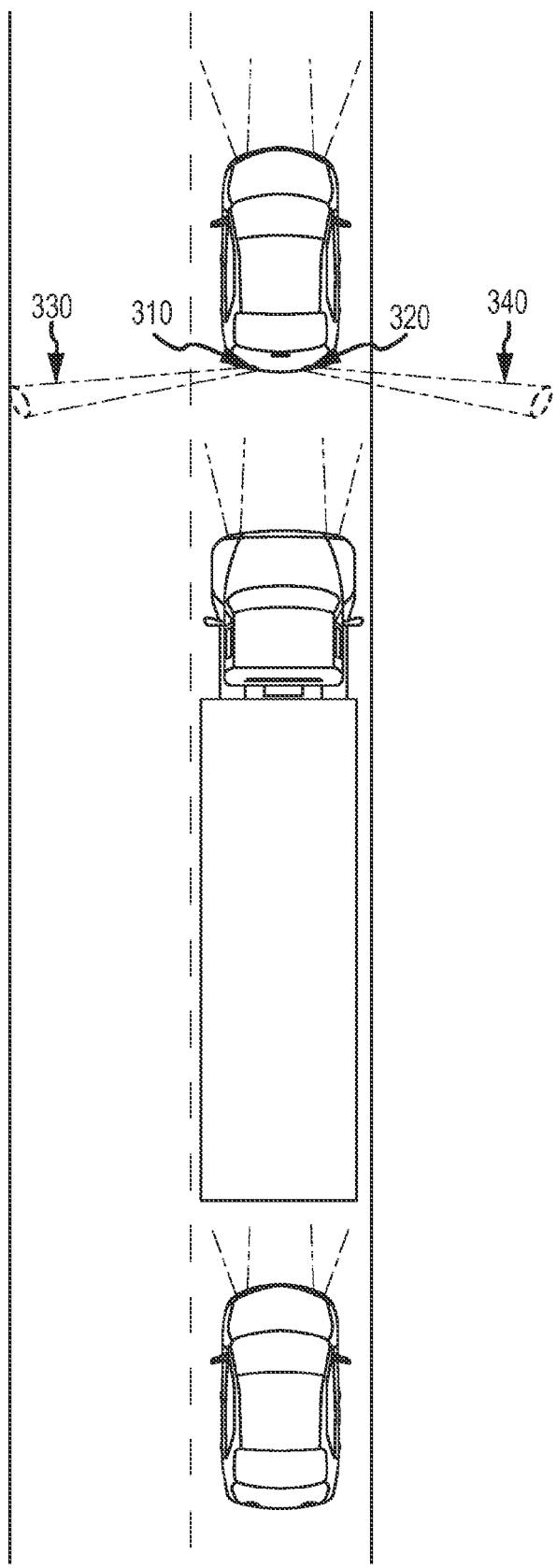
FIG. 3 is a top view of the example from FIG. 1 showing the vehicle-in-distress using hazard beacons.
Figure 4:
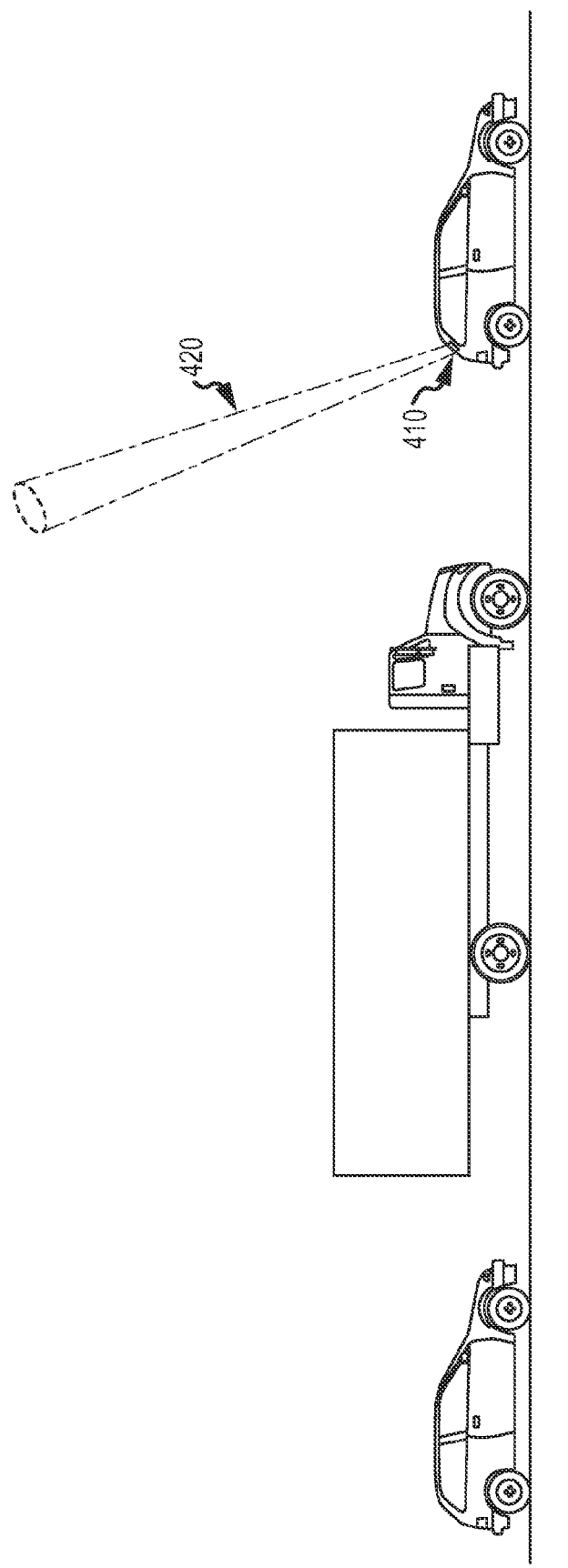
FIG. 4 is a side view of the example from FIG. 1 showing the vehicle-in-distress using a hazard beacon.
Figure 5:
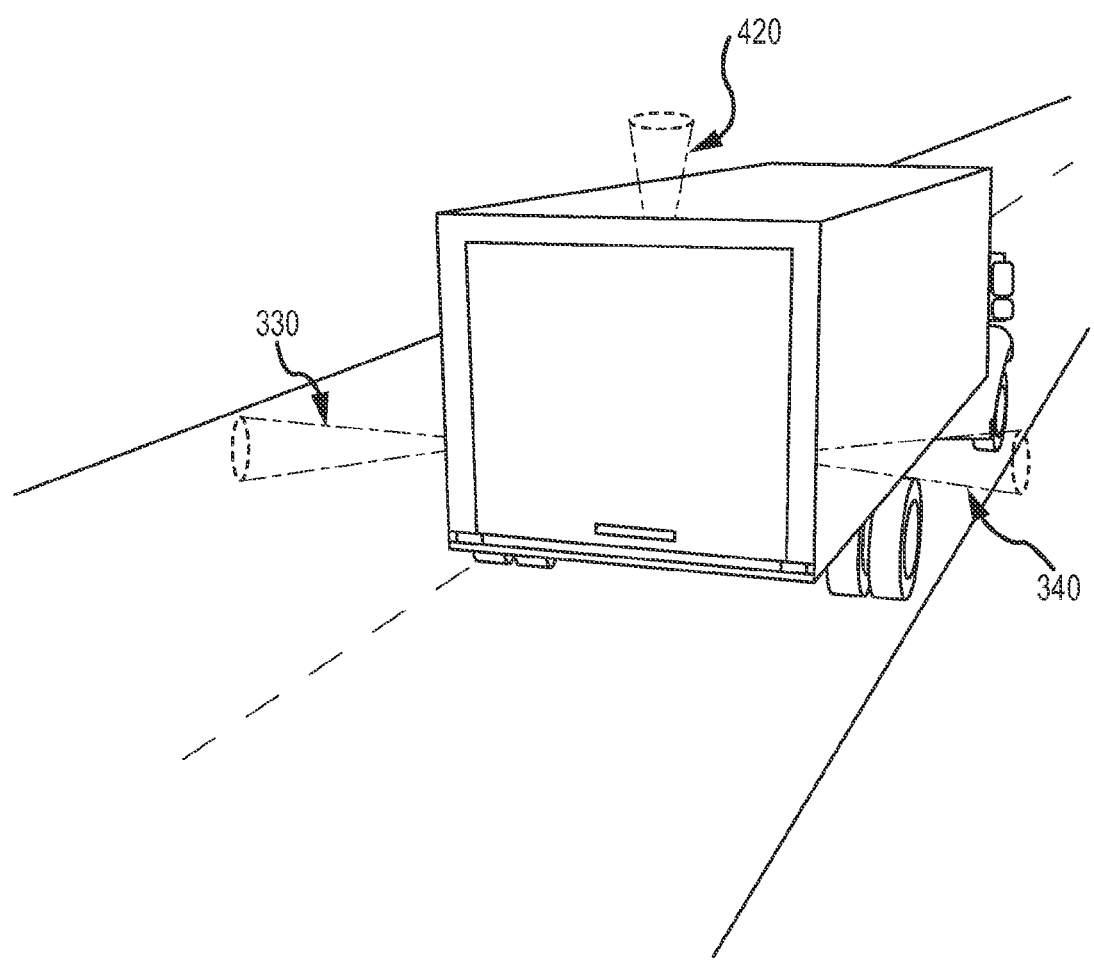
FIG. 5 illustrates the example from FIG. 1 as seen from a vehicle-approaching-from-the-rear with the vehicle-in-distress using hazard beacons.

FIG. 3 is a top view of the example from FIG. 1 showing the vehicle-in-distress using hazard beacons 310 and 320 which shine well-defined beams of light 330 and 340 to the sides of the vehicle-in-distress. FIG. 4 is a side view of the example from FIG. 1 showing the vehicle-in-distress using a hazard beacon 410 casting a well-defined beam of light 420 upward. And, FIG. 5 illustrates the example from FIG. 1 as seen from a vehicle-approaching-from-the-rear with the vehicle-in-distress using hazard beacons which produce well-defined beams of light directed both to the sides and upward. In one example, safety is enhanced because the well-defined beams of light emanating from the hazard beacons warn drivers who cannot directly see the vehicle-in-distress, i.e., vehicles which are not immediately behind the vehicle-in-distress.

Figure 6:
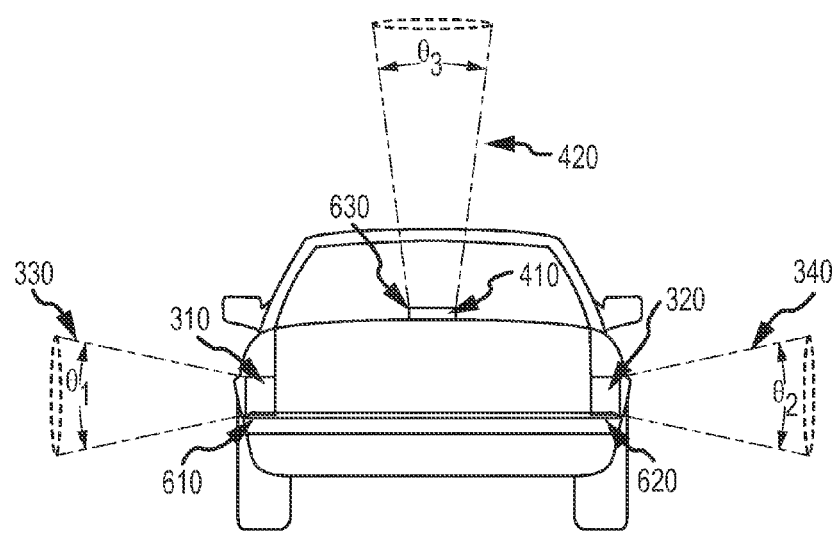
FIG. 6 illustrates an example of a vehicle using hazard beacons as seen from the rear.

FIG. 6 illustrates an example of a vehicle using hazard beacons as seen from the rear. This example illustrates a typical vehicle which on the two sides of the rear of the vehicle have light assemblies 610 and 620 containing turn-signal lights, which typically also serve as hazard flashers, brake lights, tail lights, parking lights, backup lights, etc. Although the hazard beacons do not have to be housed with other lights, in this example the hazard beacons 310 and 320 are illustrated as being placed inside these light assemblies that would also house one or more of the above-mentioned lights. In the example, locating the hazard beacons in light assemblies containing other lights is likely to minimize manufacturing costs. Although the hazard beacons need not be pulsed and controlled with the hazard flashers, sharing such control functions is likely to reduce cost. The example illustrated in FIG. 6 also shows centered above the first two light assemblies a third light assembly 630 typically containing a third brake light. This example shows the common practice of placing such a light assembly at the lower portion of the rear window of the vehicle. Although it is not necessary to house a top hazard beacon in such a light assembly, in this example a top hazard beacon 410 is illustrated as being placed inside the light assembly with the brake light since sharing the light assembly is likely to minimize manufacturing costs.

The beamwidths, $\theta_L$, $\theta_R$, and $\theta_t$, for the three well-defined beams of light 330, 340, and 420 illustrated in this one example may be the same, but may also be different. One example which would provide a high visibility is a beamwidth from 5 to 15 degrees wide. Most simply the well-defined beams of light are approximately conical, but they may have any pattern.

Figure 7:
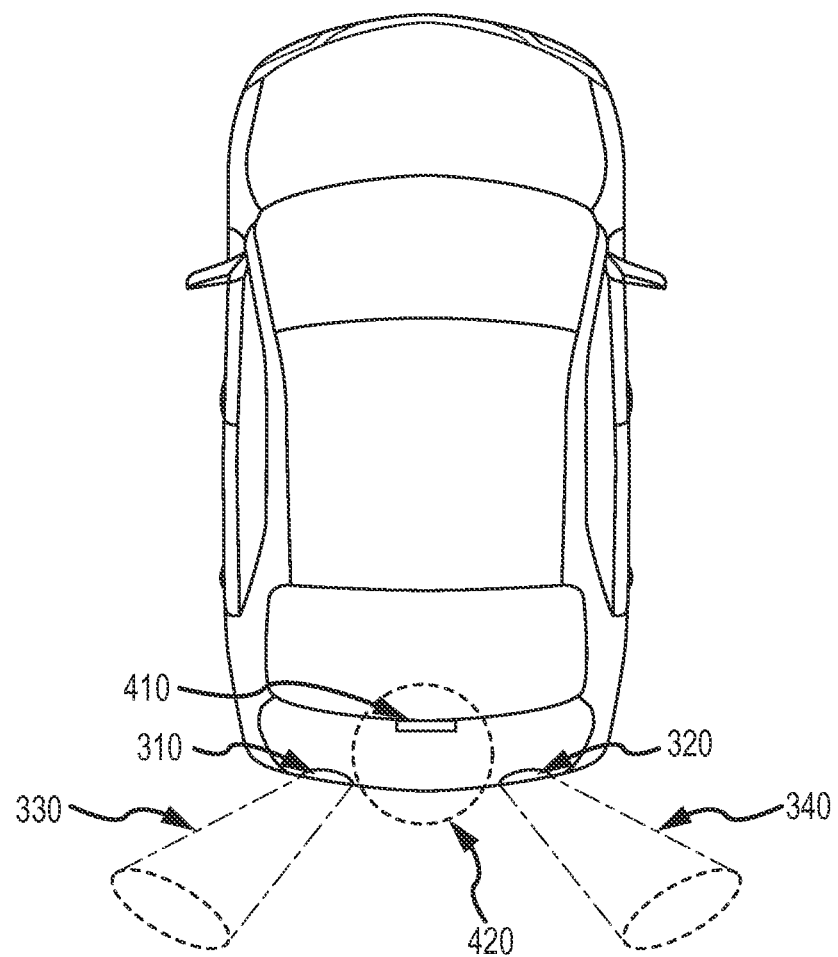
FIG. 7 illustrates the example from FIG. 6 as seen from a top view.

FIG. 7 illustrates the example from FIG. 6 as seen from a top view.

Although the hazard beacons 310, 320 and 410 are illustrated as being mounted toward the back of the vehicle, they can be located toward the front of the vehicle, on the sides, on the top or elsewhere. In the one example shown, the well-defined beams of light are shining up 420 and to the sides 330 and 340. Many other distinctive hazard beacon examples with different numbers of beams, beamwidths, beam shapes, and angles of inclination above the roadway may be used.

One example of a light source to generate the well-defined beams of light is one or more Light Emitting Diodes (LEDs). For example, an LED-based hazard beacon may use 0.1 to 3 Watts LEDs to produce a well-defined beam of suitable intensity. A measure of suitable intensity may be the distance behind a vehicle at which the hazard beacons would be visible under standard typical night driving conditions.

One example would require that the well-defined beams be visible 100 or more feet. One example of an LED-based hazard beacon uses amber colored LEDs. Many other hazard beacon examples using different numbers of LEDs, different intensity LEDs, different color LEDs, even LEDs which produce multiple colors may be used.

In the example shown in FIG. 6 and FIG. 7 the hazard beacons are housed in light assemblies with other lights. A number of arrangements of LEDs within such light assemblies may be used.

Figure 8:
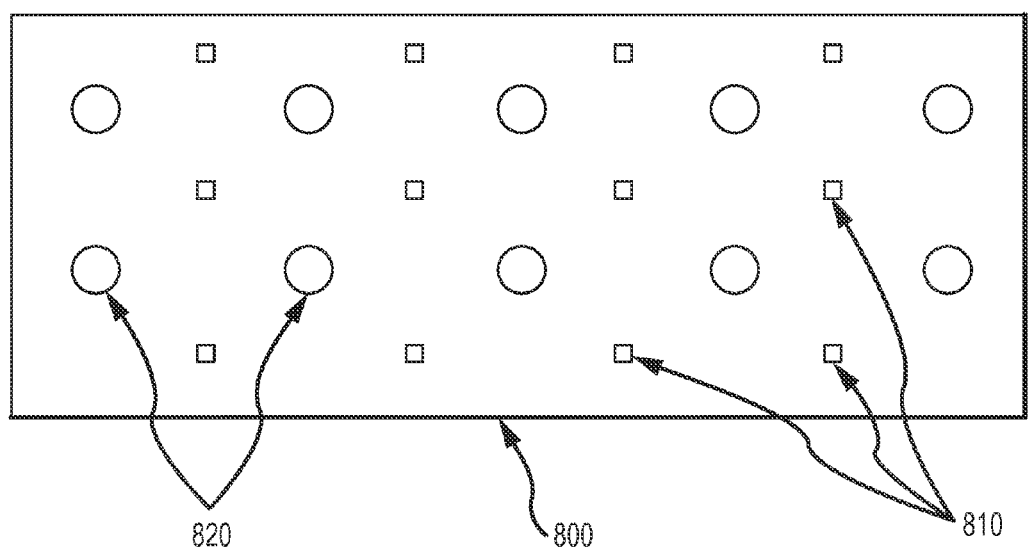
FIG. 8 illustrates an example with hazard beacon LEDs interspersed among other lights within a first light assembly.

FIG. 8 illustrates an example with hazard beacon LEDs 810 interspersed among other lights 820 within a first light assembly 800. In this example the hazard beacon LEDs are shown interspersed uniformly within a uniform grid of other lights. In other examples (not shown) the hazard beacon LEDs may be interspersed irregularly among other lights.

Figure 9:
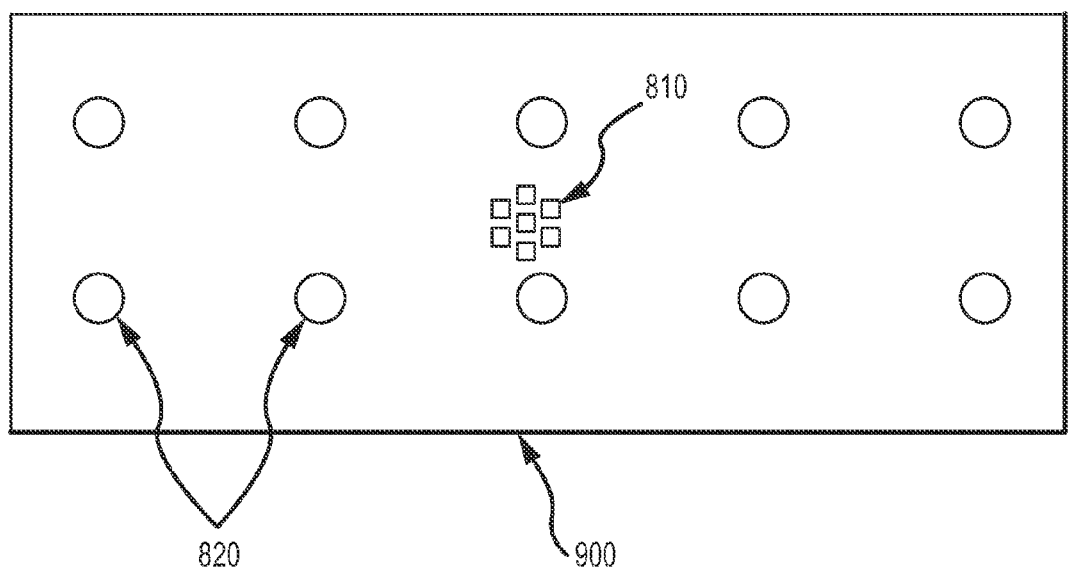
FIG. 9 illustrates an example with hazard beacons LEDs grouped as a single cluster in a second light assembly containing other lights.

FIG. 9 illustrates an example with hazard beacons LEDs grouped as a single cluster in a second light assembly 900 containing other lights. In one example (not shown) a second cluster may be added to the light assembly. One skilled in the art would understand that other clusters may be used The well-defined beams of light emanating from the hazard beacons may be generated in a number of ways. One skilled in the art would understand that the ways in which such well-defined beams of light are generated are not limited to the examples illustrated.

Figure 10:
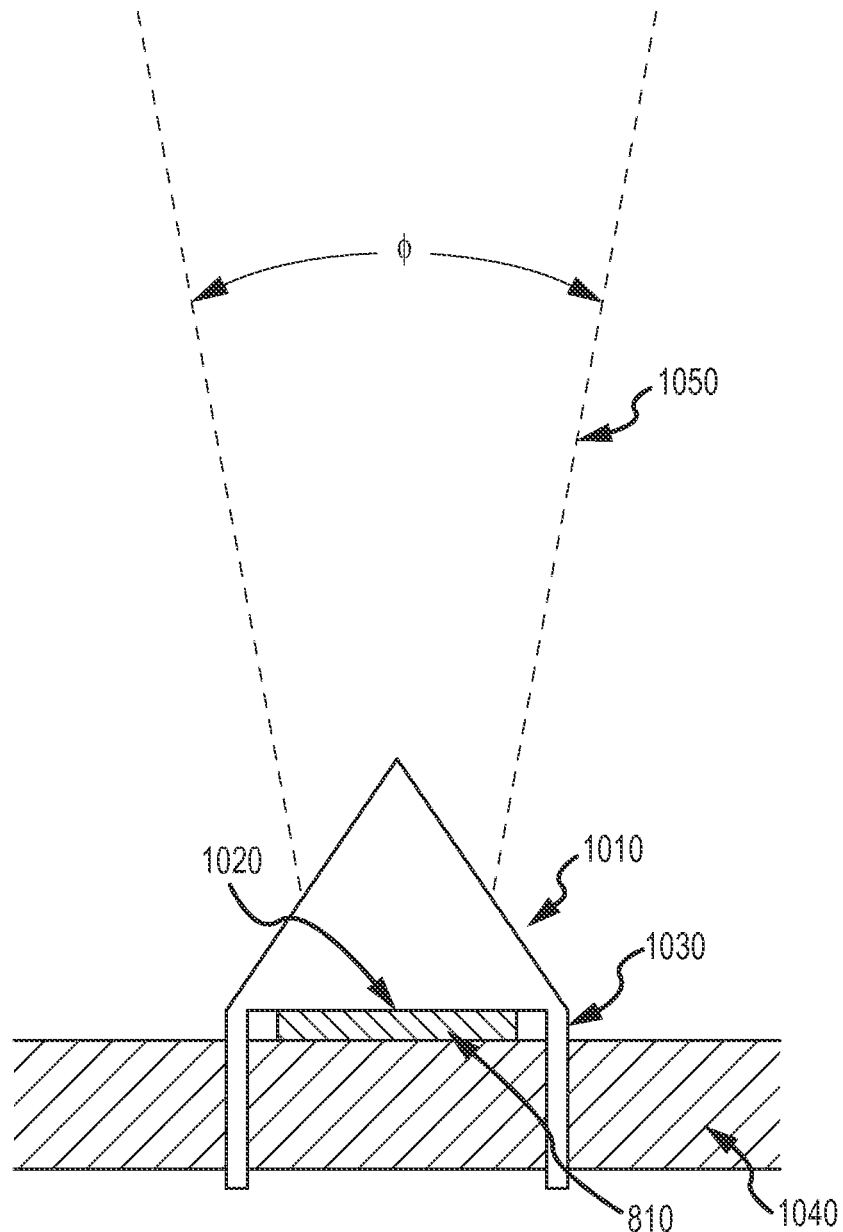
FIG. 10 illustrates an example with a well-defined beam of light focused, shaped and directed using a refractive optic lens placed on the light emitting surface of an LED.

FIG. 10 illustrates an example with a well-defined beam of light 1050 focused, shaped and directed using a refractive optic lens 1010 placed on the light emitting surface 1020 of an LED 810. In one example the refractive optic lens includes legs 1030 by which it is attached to the circuit board 1040. In one example, the refractive optic lens 1010 includes reflective properties. The shape of the refractive optic lens may vary and is not necessarily conical. Likewise the shapes of the optics shown in the other figures may vary and do not necessarily represent the shape of the actual optics. In a given application the design of the refractive optic lens is based among other factors on the refractive index of the lens material, the desired beamwidth, the orientation of the light emitted surface of the LED, and the desired directional orientation of the well-defined beam of light.

Figure 11:
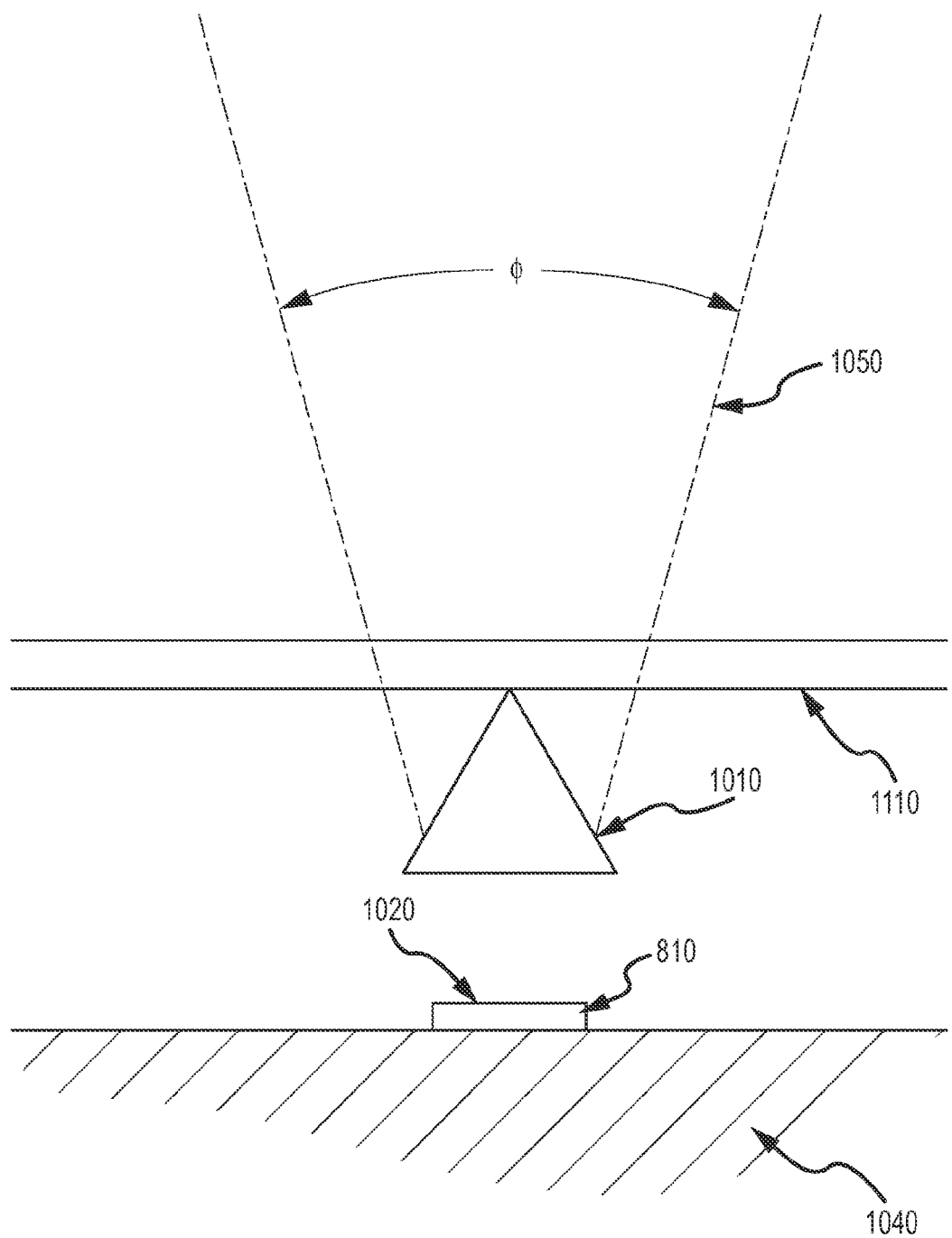
FIG. 11 illustrates an example with a well-defined beam of light focused, shaped and directed using a refractive optic lens which is suspended above the light emitting surface of an LED and attached to a transparent cover.
Figure 12:
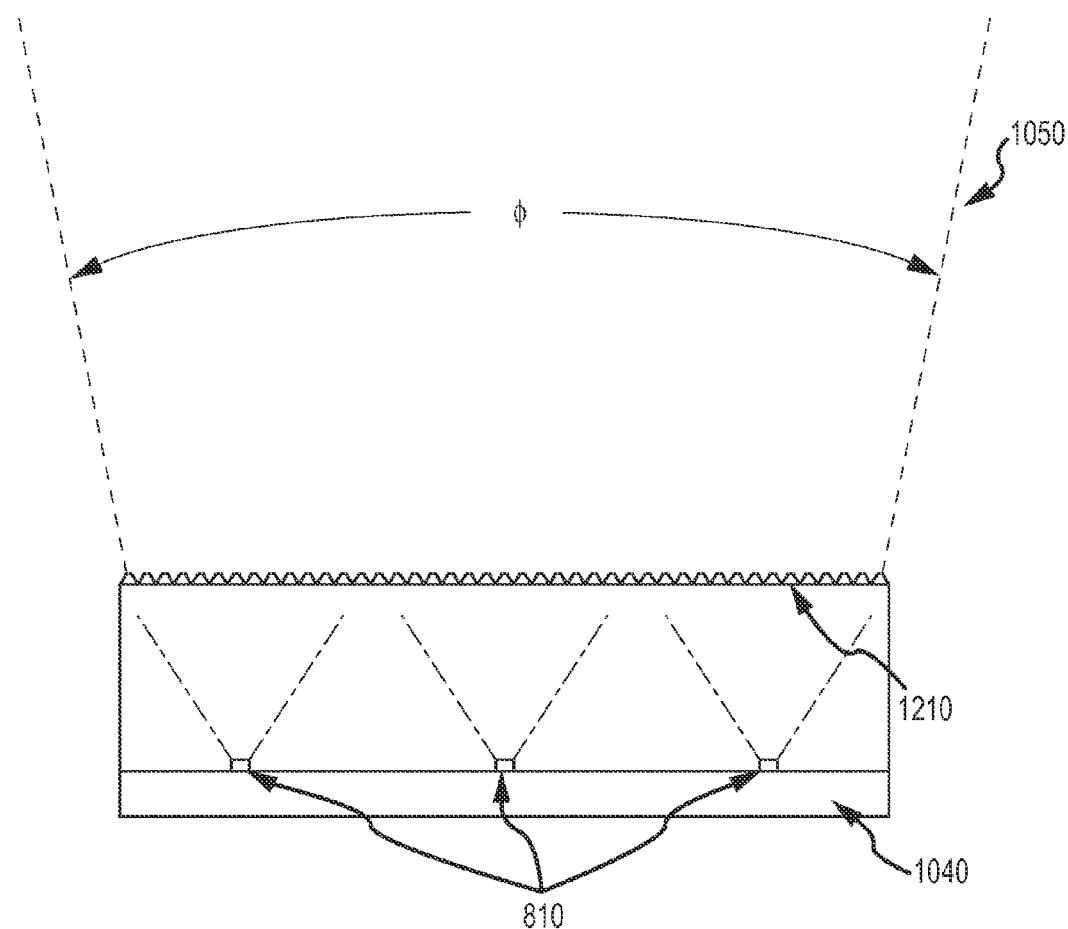
FIG. 12 illustrates an example with a well-defined beam of light focused, shaped and directed using a refractive optic lens which covers the entire light assembly.
Figure 13:
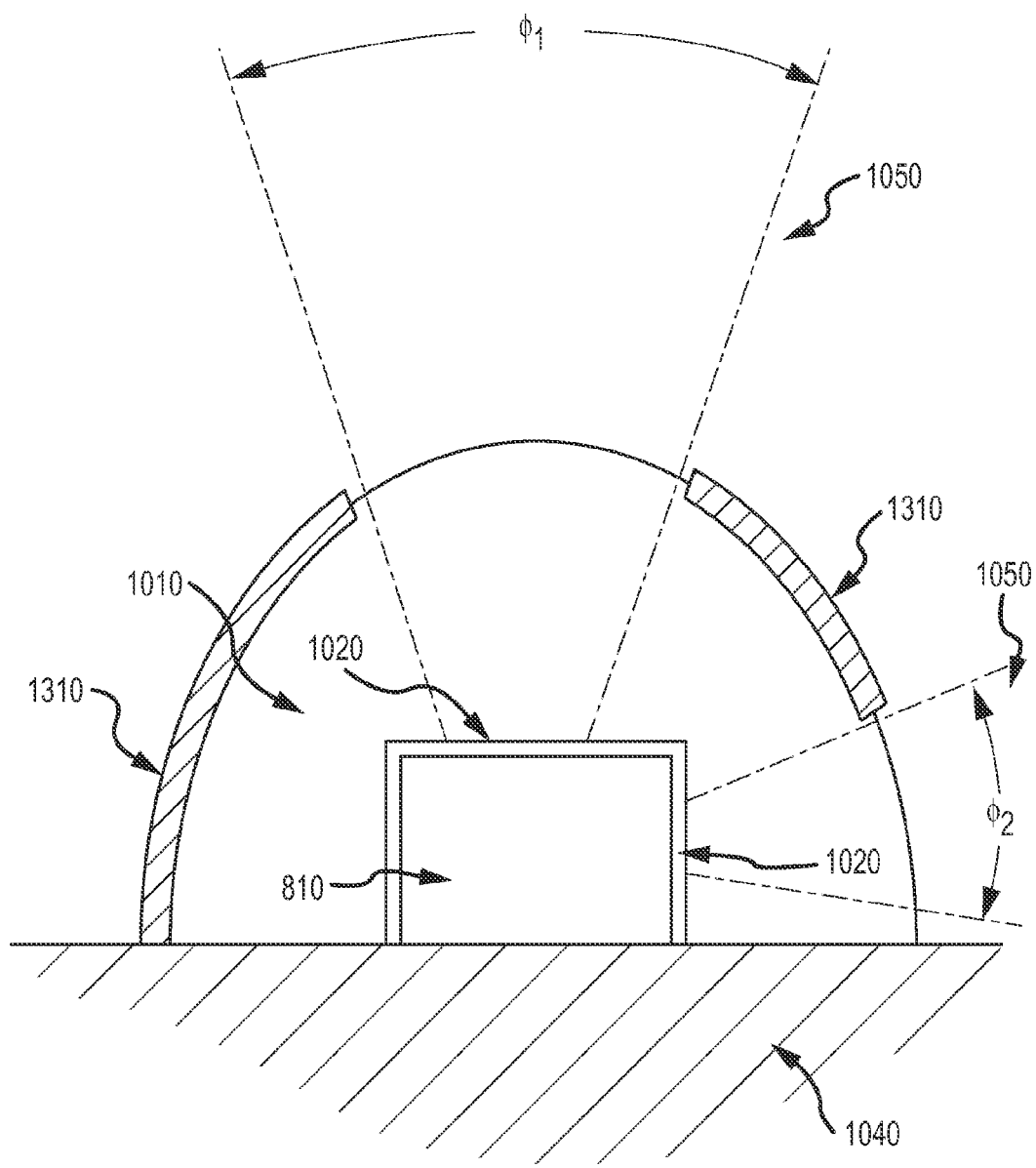
FIG. 13 illustrates an example with two well-defined beams of light focused, shaped and directed using a refractive optic lens with an opaque pattern and an LED emitting light from two surfaces.

FIG. 11 illustrates an example with a well-defined beam of light focused, shaped and directed using a refractive optic lens which is suspended above the light emitting surface of an LED and attached to a transparent cover 1110. FIG. 12 illustrates an example with a well-defined beam of light focused, shaped and directed using a refractive optic lens 1210 which covers the entire light assembly. The refractive optic lens shown resembles a Fresnel lens, but it is not limited to such a design. The refractive optic lens is shaped to focus the light from one or more LED's into a well-defined beam of light and to direct that well-defined beam of light so as to be readily seen by following traffic which is blocked from being able to see the hazard beacon directly. FIG. 13 illustrates an example with two well-defined beams of light 1050 focused, shaped and directed using a refractive optic lens 1010 with an opaque pattern 1310 and an LED 810 emitting light from two surfaces 1020. In each of these examples the well-defined beams of light can be further directed by orienting the circuit board 1040 on which the LED's are mounted. Generally the optics are simplified when the circuit board is oriented perpendicular to the desired direction of the well-defined beam of light.

Figure 14:
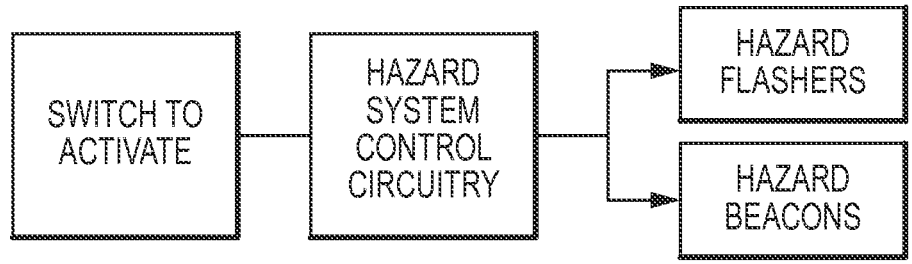
FIG. 14 illustrates in block diagrams three examples of hazard beacon control systems.
Figure 14:
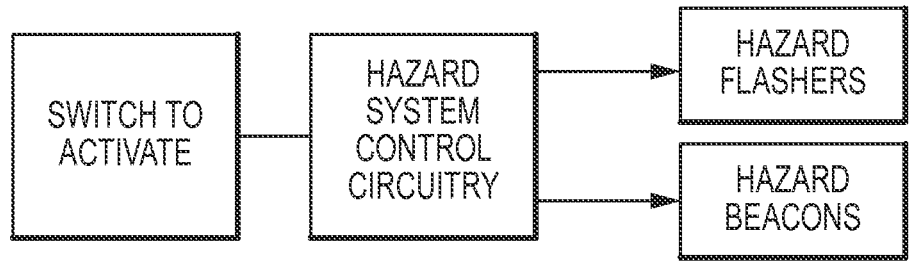
Figure 14:
Figure 14:
Figure 15:
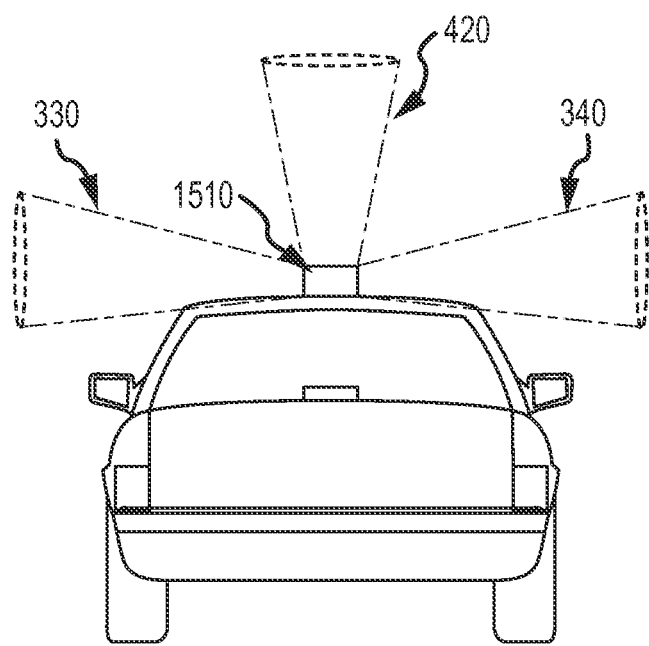
FIG. 15 illustrates an example with an independent hazard beacon attached to a vehicle.

FIG. 14 illustrates in block diagrams three examples of hazard beacon control systems. In the first example the hazard beacons are pulsed with hazard flashers. In the second example the hazard beacons are activated in conjunction with hazard flashers but pulse independently. And in the third example the hazard beacons are controlled independently of the hazard flashers. FIG. 15 illustrates an example with an independent hazard beacon 1510 attached to a vehicle. In this example the independent hazard beacon produces both well-defined beams of light 330 and 340 directed to the sides and a well-defined beam of light 420 directed upward. Such a hazard beacon system controlled independently of the hazard flashers is particularly useful for retrofitting a hazard beacon system onto a vehicle which did not originally have such a system. One skilled in the art would understand that the positioning of the independent hazard beacon 1510 onto the vehicle may vary. For example, the independent hazard beacon 1510 may be positioned at an angle (e.g., not perpendicular) relative to a structural portion of the vehicle.

Lighting may be used in other ways to provide additional useful information regarding traffic conditions. Currently vehicles typically have red brake lights which show that the brakes of the vehicle are engaged. Such an informative lighting system does not distinguish between the state where the accelerator is engaged and where it is not. In many common traffic situations a driver aware of an upcoming hazard, will first disengage the accelerator and only later engage the brakes when needed. Information as to whether the driver ahead has the accelerator engaged therefore gives early warning of possible hazards.

One example of an informative lighting system which provides information as to whether or not the accelerator is engaged would use an accelerator light or lights of a different color from the brake lights, in one example green, to show that the accelerator is engaged. One example of such an informative lighting system would also use a coasting light or lights of a third color, in one example orange, to indicate that neither the accelerator nor the brake is engaged.

One example of such informative lighting systems may use one or more LEDs. These LEDs could be single color, dual-color, tri-color, or could be capable of producing 4 or more colors. One example would use separate LEDs for different indicator functions, including brake, accelerator, or coasting. One example would use multi-color LEDs to combine two or more indicator functions within LEDs.

One example of informative lighting system would provide this additional information in the same light assembly as the third brake light in modern automobiles. One skilled in the art would recognize that many other display possibilities may be used for an informative lighting system.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:
1. A warning system comprising:
a first hazard beacon and a second hazard beacon that are mounted on a vehicle that is blocked from view of approaching traffic by an intervening vehicle;
said first hazard beacon defined by at least one Light Emitting Diode (LED) and at least one associated refractive optic lens;
said second hazard beacon defined by at least one LED and at least one associated refractive optic lens;

a mechanism for controlling the at least one LED of each of said first and second hazard beacons;

where the at least one refractive optic lens of the first hazard beacon focuses light from the at least one LED of the first hazard beacon into at least one well-defined light beams with a pattern that has a width greater than 10 degrees and a less than 15 degrees;

where the at least one refractive optic lens of the second hazard beacon focuses light from the at least one LED of the second hazard beacon into at least one well-defined light beams with a pattern with a width greater than 10 degrees and a less than 15 degrees;

wherein the pattern of the at least one well-defined light beams of the first hazard beacon and the pattern of the at least one well-defined light beams of the second hazard beacon are cast in opposite sideward directions so that the pattern is viewable on the sides of the intervening-vehicle by said approaching traffic; and, wherein the light of the at least one LED is a first preselected color if the accelerator of the vehicle is engaged, a second preselected color if the brake of the vehicle is engaged, or a third preselected color if the vehicle is coasting, wherein the first, second and third preselected colors are different from each other.

2. The system of claim 1, wherein each of the at least one LED is between 0.1 to 3 Watts.

3. The system of claim 1, wherein more than one of the at least one LED are interspersed among the at least one other light bulb within each of the first and second hazard beacons.

4. The system of claim 1, wherein more than one of the at least one LED are clustered together within each of the first and second hazard beacons.

5. The system of claim 1, wherein the mechanism for controlling the at least one LED controls includes at least one of the following characteristics of the LED: light intensity, color of light emitted or power consumption.

6. The system of claim 1, wherein one of the at least one refractive optic lenses is mounted over the associated at least one LED.

7. The system of claim 6, wherein the one of the at least one refractive optic lenses comprises at least one leg for attaching to the vehicle.

8. The system of claim 1, wherein one of the at least one refractive optic lenses focuses the at least one well defined light beam in to a conical pattern.

9. The system of claim 8, wherein the pattern allows for directing the at least one well-defined light beams in the sideward direction to the platform.

10. The system of claim 1, wherein one of the at least one LED emits one of the following colors: red, green or blue.

11. The system of claim 1, wherein one of the at least one LED is of the following: a single color LED, a dual-color LED or a tri-color LED.

12. A method of warning approaching traffic of a hazard associated with a vehicle, where the vehicle is blocked from view of said approaching traffic by an intervening vehicle, said method comprising the steps of:

mounting a hazard beacon on the vehicle, said hazard beacon being defined by at least one Light Emitting Diode (LED) and a refractive lens;

casting a pattern of at least one well-defined light beam from the hazard beacon so that said pattern emanates past the intervening vehicle into the view of said approaching traffic, said pattern from said at least one well-defined light beam being accomplished via operating the at least one LED through the refractive lens;

mounting a second hazard beacon on the vehicle, said second hazard beacon being defined by a second set of at least one LED and a second refractive lens;

casting a second pattern of a second at least one well-defined light beam from the second hazard beacon so that said second pattern emanates in a different direction than the first pattern beyond the intervening vehicle into the view of said approaching traffic, said pattern from said second at least one well-defined light beam being accomplished via operating the second at least one LED through the second refractive lens;

where the first and second well-defined light beams of the first and second hazard beacons are a first preselected color if the accelerator of the vehicle is engaged, a second preselected color if the brake of the vehicle is engaged, or a third preselected color if the vehicle is coasting, wherein the first, second and third preselected colors are different from each other; and, where the first and second patterns are conical with a width of between 10 degrees and 15 degrees.

\* \* \* \* \*